(12) United States Patent
Reichard et al.

(10) Patent No.: US 7,831,411 B2
(45) Date of Patent: Nov. 9, 2010

(54) DIAGNOSTIC TOOL FOR RETROACTIVE ASSESSMENT OF INDUSTRIAL PROCESS PERFORMANCE

(75) Inventors: Douglas J. Reichard, Fairview, OH (US); Kenneth S. Plache, Scottsdale, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 214 days.

(21) Appl. No.: 11/753,709

(22) Filed: May 25, 2007

(65) Prior Publication Data

US 2008/0294275 A1    Nov. 27, 2008

(51) Int. Cl.
*G06F 11/30*    (2006.01)
(52) U.S. Cl. .................. 702/183; 702/185; 702/187; 700/88; 700/108
(58) Field of Classification Search .......... 700/83, 700/88, 108–110; 702/81, 84, 85, 105, 182–185, 702/187, 188; 703/6, 7; 706/920
See application file for complete search history.

(56) References Cited

U.S. PATENT DOCUMENTS

| | | | | |
|---|---|---|---|---|
| 5,483,468 | A * | 1/1996 | Chen et al. | 702/186 |
| 5,485,620 | A * | 1/1996 | Sadre et al. | 700/83 |
| 5,893,053 | A * | 4/1999 | Trueblood | 702/187 |
| 6,157,902 | A * | 12/2000 | Hirata et al. | 703/7 |
| 6,215,746 | B1 * | 4/2001 | Ando et al. | 369/53.2 |
| 6,324,495 | B1 * | 11/2001 | Steinman | 703/6 |
| 6,535,926 | B1 | 3/2003 | Esker | |
| 6,788,218 | B2 * | 9/2004 | Sudolcan | 340/870.16 |
| 7,039,570 | B2 * | 5/2006 | Herman | 703/7 |
| 7,092,771 | B2 | 8/2006 | Retlich et al. | |
| 7,123,974 | B1 | 10/2006 | Hamilton | |
| 2006/0004862 | A1* | 1/2006 | Fisher et al. | 707/104.1 |
| 2007/0282479 | A1* | 12/2007 | Shibuya et al. | 700/108 |

* cited by examiner

*Primary Examiner*—Charles R Kasenge
(74) *Attorney, Agent, or Firm*—Boyle Fredrickson LLP; R. Scott Speroff; John M. Miller (57) ABSTRACT

An industrial control monitoring system provides visualization of historical data acquired from an industrial process in a manner that mimic real-time visualization of real-time data acquired from the industrial process. The monitoring system provides an operator interface that allows the operator to direct playback interactively, such as rewinding and forwarding of the playback.

15 Claims, 5 Drawing Sheets

DIAGNOSTIC TOOL FOR RETROACTIVE ASSESSMENT OF INDUSTRIAL PROCESS PERFORMANCE

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to a diagnostic tool that allows for retroactive assessment of an industrial process via simulation of the industrial process using historical data acquired in real-time during performance of the industrial process.

Industrial controllers are special purpose computers used for controlling industrial processes and manufacturing equipment on a real-time basis. Under the direction of a stored program, the industrial controller examines a set of inputs reflecting the status of the controlled process and changes a set of outputs controlling the industrial process. During the industrial process, those inputs and outputs can be graphically displayed using a human machine interface (HMI) in the form of process animation, ladder logic, data values, or similar construct to provide real-time or "live" monitoring of the industrial process. Moreover, an operator, such as a process engineer, may then perform any diagnostic or debugging assessments on this "live" data.

Conventional HMI's are designed to process real-time values that are input thereto by the industrial controller. In order for a process engineer to assess the industrial process using the monitoring tools provided by the HMI, such as ladder logic and process animation, functional block diagrams, and sequential function charts, simulated data values for the industrial process must be created using a model of the industrial process and input to the HMI for processing. To debug the industrial process, or portion thereof, the process engineer must either debug a simulation of the industrial process or manually create values that are believed to be consistent with those provided during the industrial process. However, this modeled data may not reveal the problem with the actual industrial process which may deviate from the idealized model.

In contrast, historian services have been implemented in industrial control applications to acquire time-series data during cycles of the industrial process for retroactive analysis. Generally, historian services collect and store the data that is fed to the HMI. The data is stored in a database that arranges the data based on the time at which it was acquired. This time-ordered data thereby provides a historical perspective of the industrial process that can be used to generate trending reports, charts, graphs, and the like that may be viewed on devices like an HMI, engineering workstation, IT computer, and similar devices.

BRIEF SUMMARY OF THE INVENTION

The present inventors have recognized that a diagnostic tool which synthesizes the advantages of a real-time monitoring tool and historian service would allow retroactive assessment of an industrial process. In this regard, the present invention allows historical data for example, from a historian service, to be fed to an HMI in a manner that mimics the input of real-time data to the HMI. As the historical data is fed to the HMI, the HMI processes the data as if it was real-time or live data. As such, the monitoring tools used for provide visualization of the real-time data may be used to provide visualization of the historical data. The present invention enables a process engineer to perform process assessment and debugging using actual data acquired from the process rather than simulated or derived data. In addition to providing a tool for true retroactive assessment of a process, the present invention allows actual data to be used for training instead of models, providing a more realistic training experience and an experience that can capture a wider variety of real world example.

In another aspect, the present invention synchronizes data from multiple historical databases based on the time-stamping of the data. As such, the present invention allows a single HMI or multiple HMIs to provide synchronized visualization of multiple parts of the industrial process for comparative analysis.

In a further aspect, the historical data is arranged in a time-ordered manner which allows interactive control of the historical data during playback with the live monitoring tools. In this regard, the present invention allows a process engineer, for example, to pause, rewind, fast forward, etc. the presentation or visualization of the historical data by the live monitoring tools.

The foregoing and other aspects of the invention will appear from the following description. In the description, reference is made to the accompanying drawings, which form a part hereof, and in which there is shown by way of illustration a preferred embodiment of the invention. Such embodiment does not necessarily represent the full scope of the invention, however, and reference must be made to the claims herein for interpreting the scope of the invention.

DETAILED DESCRIPTION OF THE INVENTION

Figure 1:
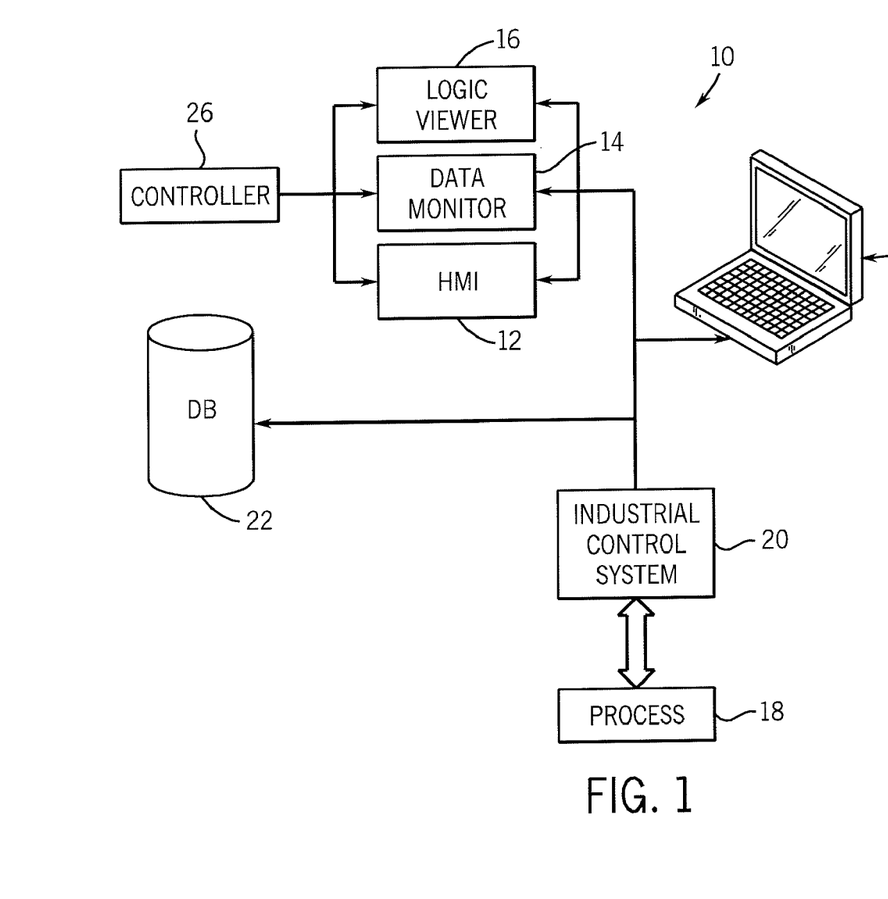
FIG. 1 is a data flow diagram of an electrical control and monitoring system in accordance with aspects of the present invention.

Referring to FIG. 1, an industrial control monitoring system 10 may include a human interface machine (HMI) 12, a data value monitor 14, and a logic viewer 16 that interact with a process 18 via an industrial control system 20, as known in the art. The HMI 12, data value monitor 14, and logic viewer 16 include displays or faceplates (not shown) that provide visualizations and animations of data acquired from the industrial process 18 via the industrial control system 20, as is known.

Process 18 may include any process capable of being remotely controlled and/or monitored. In industrial settings, for example, the process may include manufacturing, material handling, machining, assembly and other operations for producing products. In other settings, however, equipment and operations included in the process may include regulation of flows, pressures, levels, reactions, and so forth. In still other applications, the processes may include propulsion or power generation or distribution. Operation of the process 18 is controlled by the industrial control system 20 which executes a stored program to examine a set of inputs reflecting the status of the process and changes a set of outputs controlling the industrial process based on those inputs. This I/O control with the process 18 is typically through various I/O modules (not shown), as known in the art.

The HMI 12, data value monitor 14, and the logic viewer 16 interface with the industrial control system 20 and provide visualization of data acquired from the industrial process, including animations of various components of the industrial process. During operation of the process 18, the industrial control system 20 provides real-time data captured from the process 18 to the HMI 12, data value monitor 14, and/or logic viewer 16 for subsequent processing, as noted above. In addition to inputting data to the HMI 12, data value monitor 14, and the logic viewer 16, the data is also collected and stored in a database 22 for retroactive assessment of the process, as will be described in greater detail below.

During operation of the process 18, data values captured by the industrial control system 20 are fed to the HMI 12, data value monitor 14, and the logic viewer 16 sample-by-sample and in real-time. The HMI 12, data value monitor 14, and logic viewer 16 execute stored programs to process the data fed thereto. For example, the data values may be displayed in a continuously updated table by the data value monitor 14. Similarly, the data values may be interpreted to show an animation of a particular component of the process consistent with the data values acquired for that component by the HMI 12. Also, the logic associated with the industrial process 18 can be visualized by the logic viewer 16. One skilled in the art will appreciate that the HMI 12, data value monitor 14, and logic viewer 16 may be stand-alone devices or integrated into a single device. Moreover, it is recognized that the functionality provided by the HMI 12, data value monitor 14, and logic viewer 16 can be embodied software stored on a computer, such as a notebook computer 24 that is connected to the industrial control system 20.

In contrast to conventional monitoring systems, however, monitoring system 10 may also playback historical data captured and stored in database 22. In this regard, a playback controller 26 interfaces with the HMI 12, data value monitor 14, logic viewer 16 and the database 22 to feed historical data thereto when desired by the operator. Since the HMI 12, data value monitor 14, and logic viewer 16 are designed to read data values in real-time, the playback controller 26 feeds the historical data stored in database 22 in a timed manner based on the relative time each data value was acquired by the industrial control system 20. As such, the relative time between stored data values is consistent with the actual operation of the process 18. Accordingly, the visualizations and animations of the historical data can mimic visualization of real-time data.

Figure 2:
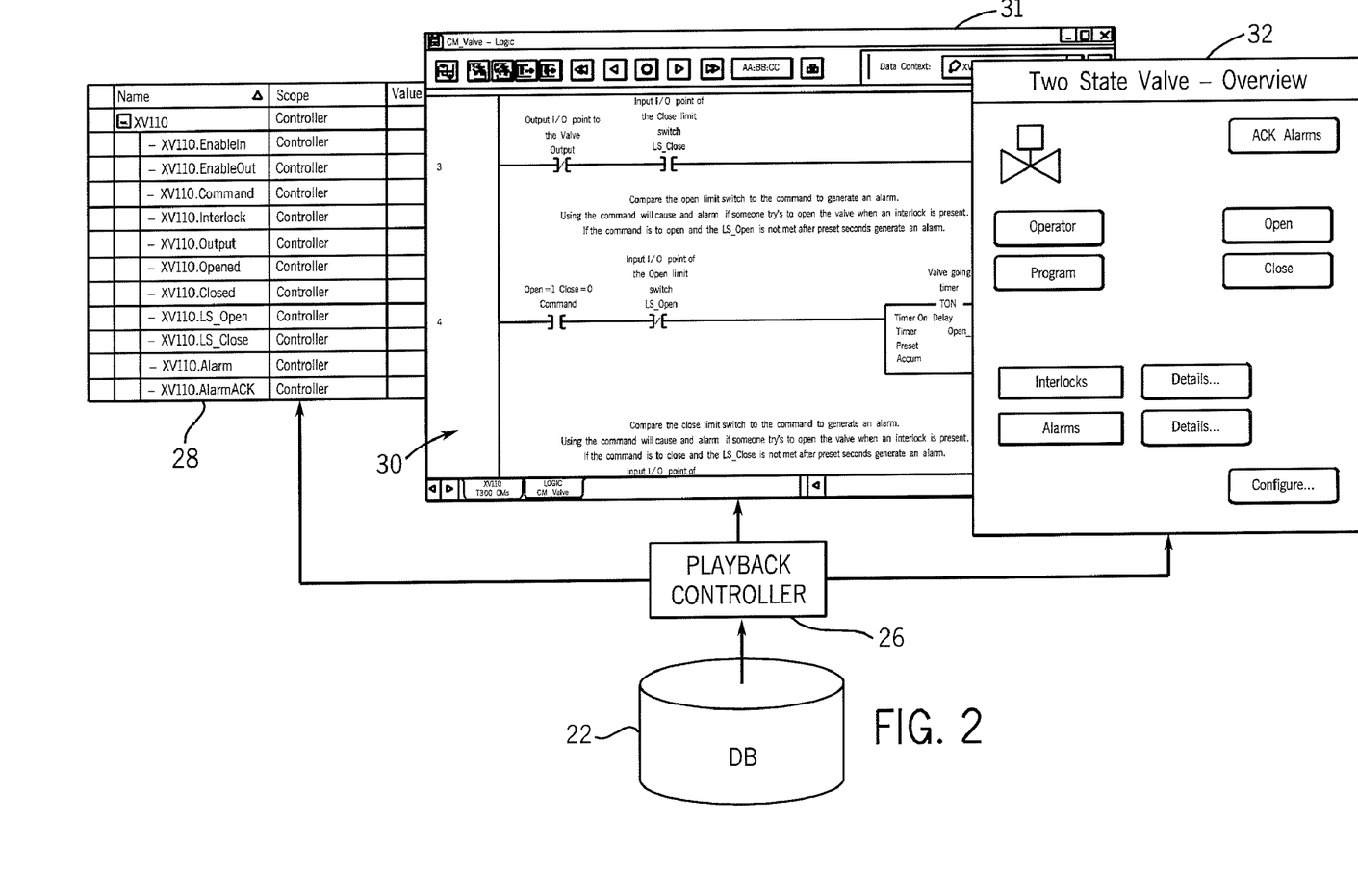
FIG. 2 is a pictorial representation of various visualizations of an industrial process per the present invention using actual data acquired from the industrial process but stored in a historical database.

As shown in FIG. 2, the monitoring tools, such as a data value listing 28 provided by data value monitor 14, ladder logic 30 provided by logic viewer 16, and animation faceplate 32 provided by the HMI 12 typically viewable during real-time monitoring of the process 18 can be viewed retroactively, but based on actual, yet stored historical data contained in database 22. The playback controller 26 drives the time-ordered data from the database 22 to the HMI 12, data value monitor 14, and the logic viewer 16 as if the historical data was live or real-time data.

Figure 3:
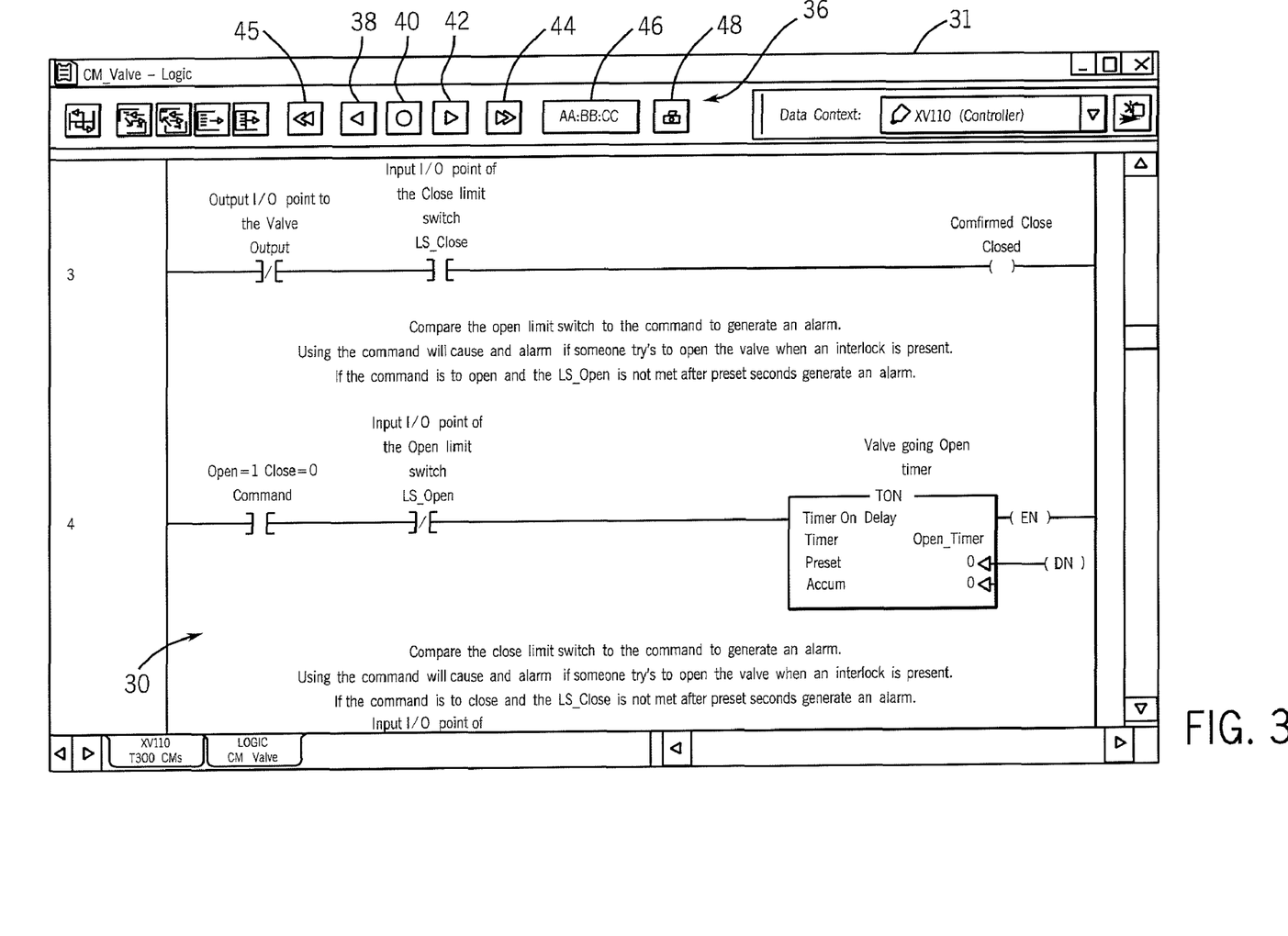
FIG. 3 is a display screen providing visualization of historical data and including a control menu of playback control buttons that facilitate operator interaction with the visualization.

FIG. 3 shows a faceplate 31 that may be generated based on historical data contained within database 22. Faceplate 31 in the illustrated example contains a visualization of a ladder logic 30 and is similar to content that typically may be contained within real-time faceplates showing logic ladders, and therefore is not in need of additional description. However, faceplate 31 includes control features not available during real-time playback of data from the process 18. Specifically, the faceplate 31 includes an interactive playback menu 36 that allows the operator to manipulate playback of the historical data. The playback menu in one embodiment includes a dedicated rewind button 38, stop button 40, play/pause button 42, and a fast forward button 44. The playback menu 36 may also include a fast-rewind button 45 that steps back through the historical data at a faster rate than that provided with selection of rewind button 38, e.g. 2×, 2×, and 4× step increments, and a fast-forward button (not shown) that steps through the historical data at a fast-forward rate that is a multiple faster than that provided by the fast forward 44 button. It is recognized that the functionality of buttons 38, 45 could be integrated into a single, toggle-able rewind button. Similarly, the various forwarding functions could be integrated into a single, toggle-able forward button.

In addition to control playback buttons 38-45, the playback menu 36 may also include a timer display 46 that can be used to show elapsed time and other time related values. Similarly, other timers could be used to show current time, time remaining, etc. for a given playback.

Additionally, in one embodiment, the playback menu 36 includes a snap-shot button 48. Operator selection of the snap-shot button 48 effectively copies the current contents of the faceplate 31 and saves those contents to a memory location. In this regard, an operator may identify a portion of the industrial process that is of particular interest, copy the visualization associated with that portion of the process and store that visualization for later use.

It is contemplated that the playback menu 36 may have additional buttons that facilitate additional interaction with the historical data. For example, the control menu may include control buttons that allow the operator to jump playback automatically to a particular point in the industrial process based on time or auto-detection of a particular condition within the historical data.

Figure 4:
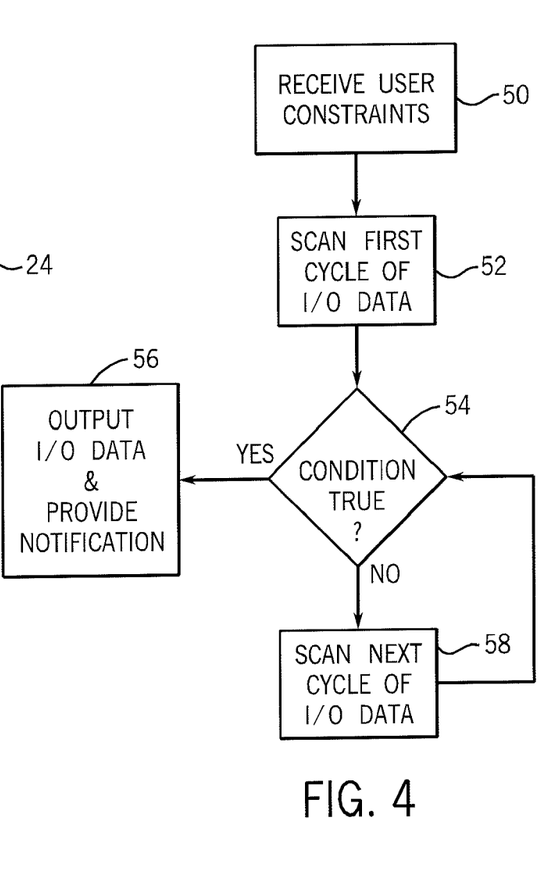
FIG. 4 is a flow chart showing the steps of determining if constraint conditions have been satisfied with the historical data according to another aspect of the invention.

In one embodiment and referring to FIG. 4, an operator may define a series of constraints that indicate a particular condition within the historical data at block 50. In one embodiment, those constraints are in the form of logic values for various entries within the historical data. For example, the I/O table populated by the I/O modules during the process typically will be populated with binary representations of either "0" or "1". Thus, the operator can prescribe the constraint by setting forth the values in the I/O table that correspond to that condition. The playback controller 26 may then cycle through the I/O data beginning with a "first cycle" at block 52. The first cycle may correspond to the data acquired during the first I/O cycle of the process or may represent merely an arbitrary first set of I/O data based on a given time period identified by the operator. For example, the operator may instruct the playback controller 26 to commence searching for data matching the prescribed constraint beginning at I/O cycle 115 rather than I/O cycle 1. Accordingly, beginning with the "first cycle", the playback controller 26 compares the historical data with the constraint conditions at block 54. If the conditions are met, the playback controller 26 outputs the corresponding data to the HMI 12, for example, and provides a corresponding notification to the operator that data matching the constraint has been found at block 56. However, if the constraint is not satisfied at block 54, the playback controller 26 proceeds to the next cycle of data at block 58. The playback controller 26 then returns to block 54 and determines if the constraints have been satisfied. The playback controller 26 proceeds to consider each of the cycles of data until either the constraint is satisfied or the all cycles of I/O data have been considered.

It is recognized that more than one cycle of data may meet the constraint conditions, therefore it is contemplated that the playback controller 26 may consider all the cycles of data for satisfaction of the constraint conditions and provide respective outputs and notifications accordingly.

In a further embodiment of the invention, the HMI 12, data value monitor 14, and logic viewer 16 may be toggled between real-time data and historical data. That is, in one embodiment, the present invention provides for feeding of historical data via one input channel and feeding of real-time data via another input channel. This allows an operator to analyze historical data during an active process.

Additionally, this allows an operator to perform predictive analysis of an active process. For example, an operator may perform a search of historical data that is similar or matched to live data being viewed in real-time, and use the historical data to predict what may subsequently happen in the active process. For instance, if the operator sees the "beginning" of a process anomaly or disturbance, the operator may then initiate a search of the historical database for a similar occurrence and view the historical data to "predict" what is going to happen. In this manner, the operator may be able to more effectively fix a potential problem before the problem actually manifests in the active process.

Figure 5:
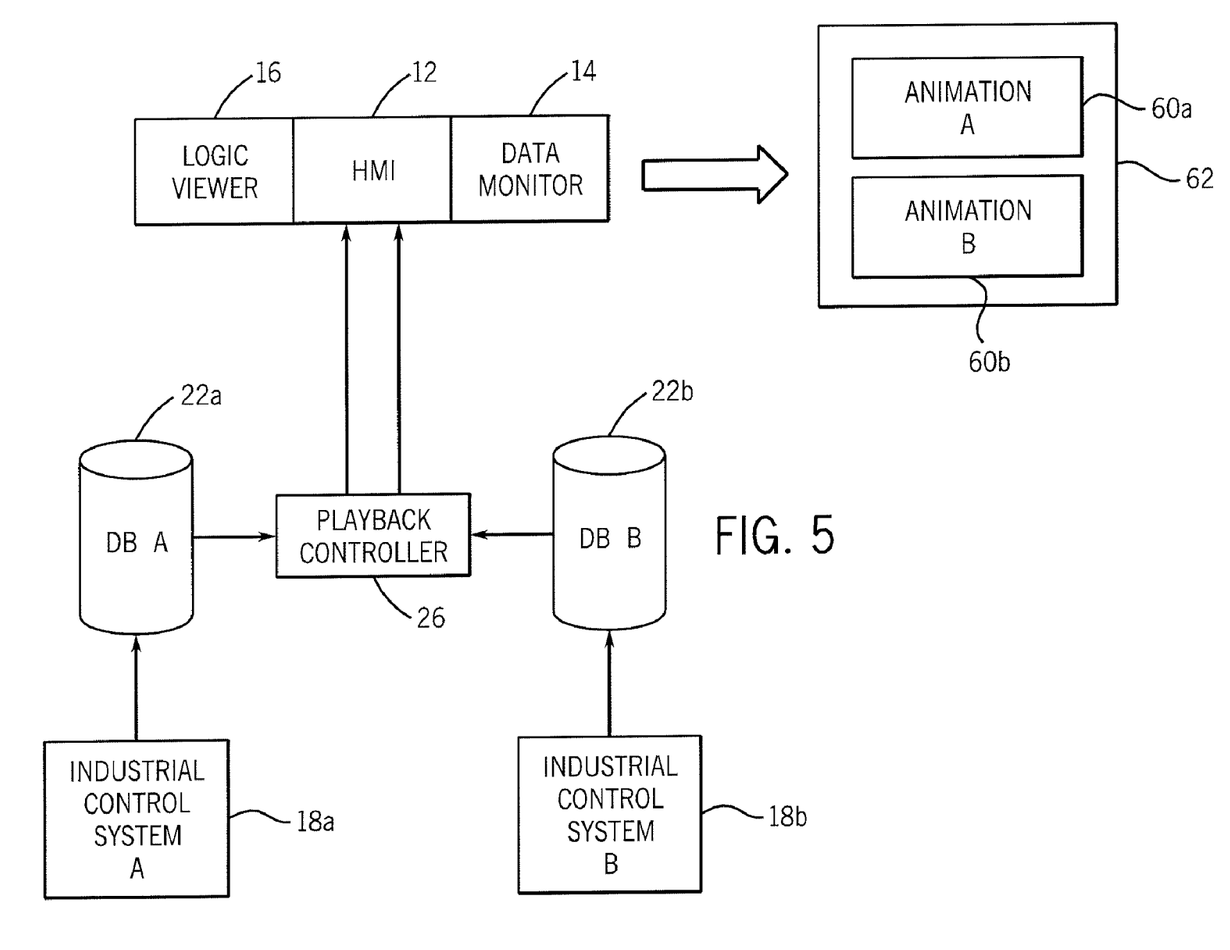
FIG. 5 is a figure similar to FIG. 1 illustrating time-synchronized, parallel visualization of historical data from two different historical databases.

Referring now to FIG. 5, the present invention also allows the data from multiple historical databases to be fed to the HMI 12, data value monitor 14, and logic viewer 16 in parallel for comparative analysis. Specifically, in the illustrated example, two different databases 22a, 22b contain historical data acquired from two different industrial control systems 18a, 18b. The data from the databases is processed separately to provide separate visualizations 60a, 60b of respective portions of the process 18 in a single faceplate 62, or multiple faceplates shown on a single or multiple displays.

In a preferred embodiment, the data acquired from multiple control systems is synchronized in accordance with the Precision Time Protocol (PTP) defined in the IEEE 1588-2002 standard that allows precise synchronization of networks, e.g., Ethernet. More particularly, the clocks of the multiple control systems are synchronized in accordance with the 1588 time synchronization protocol. Compliance with the 1588 time synchronization protocol, using hardware generated timestamps, provides synchronization accuracy within the nanosecond range. In addition to accurate synchronization, synchronizing the clocks of the multiple control systems according to the 1588 time synchronization protocol provides higher resolution data when compared to conventional historian services. Moreover, since the historical data is time-stamped in the industrial controlling by the industrial controllers in accordance with the 1588 time synchronization protocol, the replay of the synchronized historical data is believed to be extremely accurate as well.

This parallel visualization of historical data allows an operator to perform a comparison between various portions of the process, or multiple processes. Moreover, since the historical data contained in the databases, e.g., 22a, 22b, is time-ordered, the comparative analysis can be performed in a time-sensitive manner. That is, the data across multiple databases can be aligned so that the visualization of historical data from one historical database is based on data acquired during a given time period and the visualization of historical data from another database is based on data acquired during that same given time period, but for a different portion of the process. Thus, the present invention allows an operator to compare portions of the process that occurred simultaneously in visualizations that are correspondingly simultaneous with one another.

Figure 6:
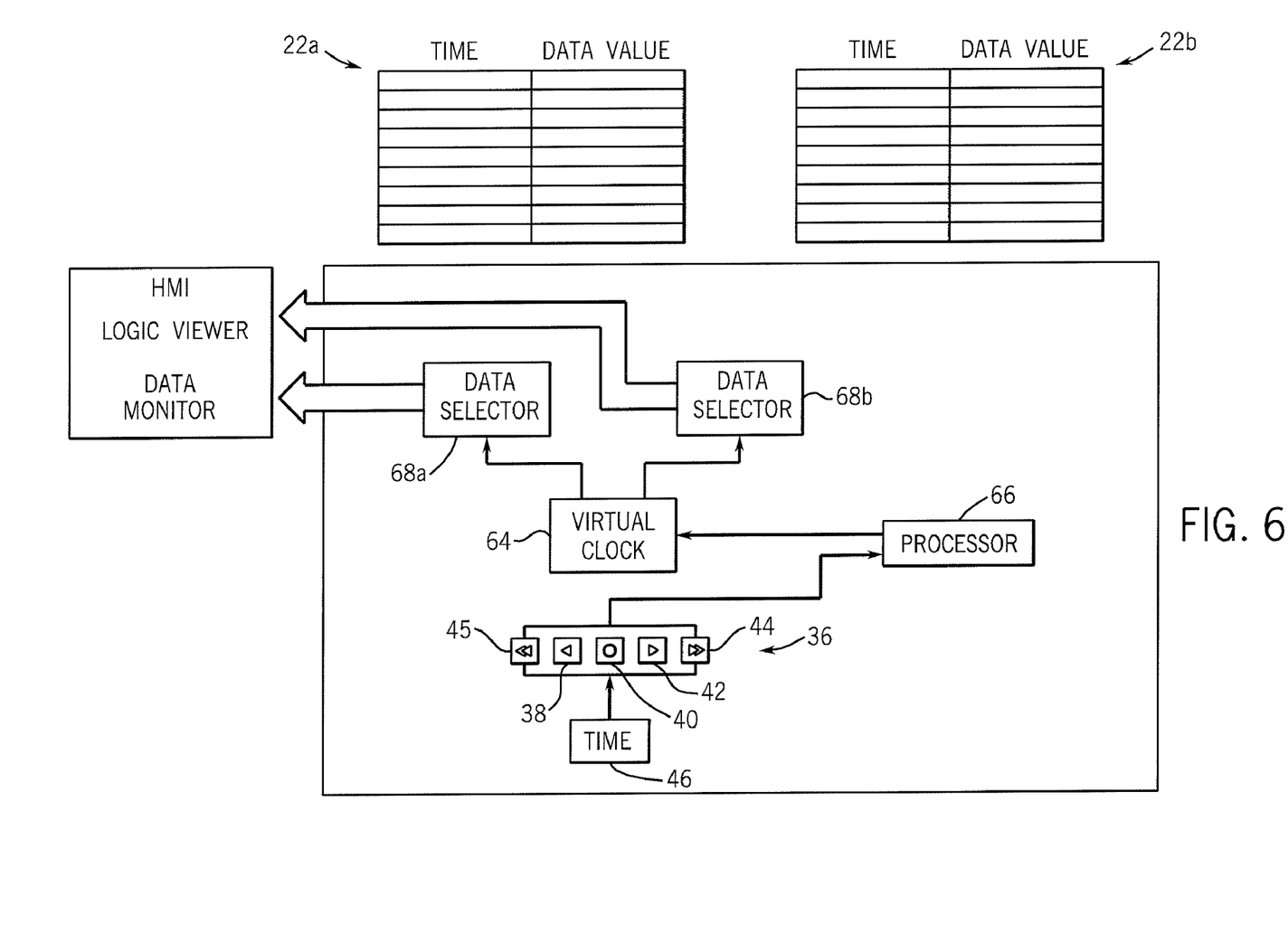
FIG. 6 is a data flow diagram of a play back controller per the present invention.

Referring now to FIG. 6, the playback controller 26 includes a virtual clock 64 and processor 66 that coordinates data extraction from a historical database, e.g., database 22. FIG. 6 is shown with the playback controller 26 connected to playback data contained in two separate databases 22a, 22b. In this regard, the playback controller 26 includes two data selectors 68a, 68b that pull data from the databases 22a, 22b, respectively, based on operator commands received via playback menu 36. Accordingly, when an operator initiates playback of the historical data via input to play button 42, the processor 66 instructs the data selectors 68a, 68b to begin data extraction with the data values corresponding for the first time stamp. Data is extracted from the databases 22a, 22b at a playback rate that mimics the speed at which the data was acquired from the industrial control process 18. The playback controller 26 thus plays back the historical data as if the data was being acquired from the industrial control process 18 in real-time. When the operator signals a stepping through the historical data, such as via rewind button 38 or fast forward button 44, the processor 66 redefines the cycle time of the virtual clock 64. Responsive thereto, the data selectors 68a, 68b adjust the sampling speed (data extraction time) of the databases 22a, 22b accordingly.

It is contemplated that historical data may be stored and used, not for retroactive assessment of the process, but as real-world data for training or debugging exercises. In this regard, actual in-field or plant data could be used for process simulation rather than manually developing or deriving simulation values.

Further, it is contemplated that the playback controller 26 described herein may have an internal buffer in which historical data is buffered as that data is collected from the database and fed to the monitoring tools.

The present invention has been described in terms of the preferred embodiment, and it is recognized that equivalents, alternatives, and modifications, aside from those expressly stated, are possible and within the scope of the appending claims.

We claim:

1. An apparatus for troubleshooting an industrial process having a monitor that provides real-time animation of the industrial process and at least one database that stores time-stamped data provided by an industrial control system during real-time operation of the industrial process, the apparatus comprising a monitoring device that has a stored program that causes the monitoring device to:

read time-stamped data from a database that is indicative of a real-time performance of the industrial process, wherein the time-stamped data was acquired during a previous performance of the industrial process and wherein the time-stamped data indicates a previous execution of control logic instructions by the industrial control system, at least some of the control logic instructions responding to input signals from a controlled process for producing products indicating a status of the controlled process and at least some of the control logic instructions generating output signals to the controlled process the output signals controlling the controlled process; and generate and display a non-real-time animation of the industrial process from the time-stamped data in a manner that mimics the real-time performance of the industrial process, the animation showing animated execution of a visual representation of the control logic instructions executed by the industrial control system;

wherein the stored program further causes the monitoring device to read time-stamped data from another database, and generate and display another non-real-time animation of the industrial process, the second animation showing animated execution of a visual representation of control logic instructions executed by a second industrial control system and wherein the non-real-time animation and the another non-real-time animation are synchronized in time with one another according to the time stamps of the data.

2. The apparatus of claim 1 wherein the stored program further causes the monitoring device to be responsive to operator inputs to control the non-real time animation.

3. The apparatus of claim 1, wherein the monitoring device is one of an HMI, a logic viewer, and a data value monitor.

4. A method of assessing performance of an industrial process during a performance interval, the method comprising:
    acquiring time-stamped data from an industrial control system that executes a series of logic steps to control operation of the industrial process, the time-stamped data acquired during a live performance interval in which an operator desires to conduct post-operation analysis of the industrial process and wherein the time-stamped data indicates a prior execution of control logic instructions by the industrial control system, at least some of the control logic instructions responding to input signals from a controlled process for producing product indicating a status of the controlled process and at least some of the control logic instructions generating output signals to the controlled process the output signals controlling the controlled process; and
    presenting the time-stamped data acquired during the live performance interval to an operator as a first non-real-time animation showing animated execution of a visual representation of the control logic instructions executed by the industrial control system and in a manner that allows the operator interactive control of the time-stamped data to assess performance of the industrial process relative to the logic steps the industrial control system executed during the performance interval; and
    causing the monitoring device to read time-stamped data from another database, and generate and display a second non-real-time animation of the industrial process the second non-real time animation showing animated execution of a visual representation of control logic instructions executed by a second industrial control system, and wherein the first non-real-time animation and the second non-real-time animation are synchronized in time with one another according to the time stamps of the data.

5. The method of claim 4 further comprising presenting the time-stamped data on a display, together with virtual controls that allow interactive control of the time-stamped data.

6. The method of claim 5 wherein the display is connected to a monitoring device having stored programs that cause playback of the time-stamped data, and further comprising play, rewind, fast-rewind, forward, fast-forward, or pause playback of the time-stamped data in response to a corresponding user input controls.

7. The method of claim 6 wherein presenting the time-stamped data includes generating and playing an animation on the display that graphically shows operation of the industrial process during the performance interval.

8. The method of claim 4 further comprising automatically identifying a beginning of the performance interval in the time-stamped data based on an identified anomaly in the time-stamped data.

9. The method of claim 8 further comprising replacing a portion of the time-stamped data corresponding to a failure in the industrial process with corrective data designed to correct the failure, playing back the time-stamped data with the corrective data, and assessing an effectiveness of the corrective data on the industrial process therefrom.

10. The method of claim 4 further comprising presenting two separate visualizations synchronized in time with one another, of different portions of the industrial process from the two sets of time-stamped data acquired during the performance interval.

11. The method of claim 10 when the two separate visualizations are displayed on a common display screen.

12. An apparatus comprising:
    an industrial control system having an industrial controller that executes a stored program to control an industrial process;
    a data capture service that captures data from the industrial control system during live execution of the industrial process, the stored program including at least some control logic instructions responding to input signals from a controlled process for producing product indicating a status of the controlled process and at least some control logic instructions generating output signals to the controlled process the output signals controlling the controlled process;
    a data playback device that plays back the captured data as an animation showing animated execution of a visual representation of the control logic instructions executed by the industrial control system; and
    an operator interface connected to the data playback device and having controls that allow interactive playback of the data in the animation by an operator;
    wherein the interactive playback permits selection of a rate of playback of the data of the animation among different speeds faster than real-time;
    wherein the interactive playback includes jumping playback of the data in the animation to a user-selected time frame based on a particular condition within the captured data associated with input and output values communicated between the industrial controller and the industrial process; and
    wherein the interactive playback includes at least one of pausing playback of the data of the animation, rewinding playback of the data in the animation, fast-rewinding playback of the data of the animation, forwarding playback of the data in the animation, and fast-forwarding playback of the data in the animation.

13. The apparatus of claim 12 wherein the data capture service time-stamps the data as the data is acquired.

14. The apparatus of claim 12 wherein the data playback device plays back the data in the animation in a manner that mimics real-time operation of the industrial process during capturing of the data by the data capture service.

15. The apparatus of claim 14 wherein the data playback device is one of an HMI, a logic viewer, a data value monitor, and a computer.

* * * * *

UNITED STATES PATENT AND TRADEMARK OFFICE
CERTIFICATE OF CORRECTION

| | | |
|---|---|---|
| PATENT NO. | : 7,831,411 B2 | |
| APPLICATION NO. | : 11/753709 | |
| DATED | : November 9, 2010 | |
| INVENTOR(S) | : Douglas J. Reichard et al. | |

It is certified that error appears in the above-identified patent and that said Letters Patent is hereby corrected as shown below:

Col. 6, line 50 Claim 1,     After "process" insert --and--.

Signed and Sealed this
Thirty-first Day of May, 2011

David J. Kappos
*Director of the United States Patent and Trademark Office*